US011954025B2

(12) United States Patent
Venkatesh et al.

(10) Patent No.: US 11,954,025 B2
(45) Date of Patent: *Apr. 9, 2024

(54) SYSTEMS AND METHODS FOR READING AND WRITING SPARSE DATA IN A NEURAL NETWORK ACCELERATOR

(71) Applicant: Meta Platforms Technologies, LLC, Menlo Park, CA (US)

(72) Inventors: Ganesh Venkatesh, San Jose, CA (US); Liangzhen Lai, Fremont, CA (US); Pierce I-Jen Chuang, Sunnyvale, CA (US); Meng Li, Newark, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,228

(22) Filed: Mar. 24, 2023

(65) Prior Publication Data
US 2023/0229591 A1 Jul. 20, 2023

Related U.S. Application Data

(63) Continuation of application No. 16/509,138, filed on Jul. 11, 2019, now Pat. No. 11,630,770.

(51) Int. Cl.
*G06F 12/04* (2006.01)
*G06N 3/08* (2023.01)

(52) U.S. Cl.
CPC ...... *G06F 12/04* (2013.01); *G06F 2212/1028* (2013.01); *G06N 3/08* (2013.01)

(58) Field of Classification Search
CPC ............ G06F 12/0871; G06F 12/0886; G06F 12/0893; G06F 12/04; G06F 2212/1028; G06F 12/02
See application file for complete search history.

(56) References Cited

U.S. PATENT DOCUMENTS 4,219,874 A * 8/1980 Gusev ............... G06F 12/04
712/300
5,931,945 A * 8/1999 Yung ................. G06F 12/08
711/159

(Continued)

OTHER PUBLICATIONS

Bell N., et al., "Implementing Sparse Matrix-Vector Multiplication on Throughput-Oriented Processors," High Performance Computing Networking, Storage and Analysis, Association for Computing Machinery, Nov. 14, 2009, 11 Pages, XP058111865.

(Continued)

*Primary Examiner* — Paul M Knight
(74) *Attorney, Agent, or Firm* — Foley & Lardner LLP

(57) ABSTRACT

Disclosed herein includes a system, a method, and a device for reading and writing sparse data in a neural network accelerator. A mask identifying byte positions within a data word having non-zero values in memory can be accessed. Each bit of the mask can have a first value or a second value, the first value indicating that a byte of the data word corresponds to a non-zero byte value, the second value indicating that the byte of the data word corresponds to a zero byte value. The data word can be modified to have non-zero byte values stored at an end of a first side of the data word in the memory, and any zero byte values stored in a remainder of the data word. The modified data word can be written to the memory via at least a first slice of a plurality of slices that is configured to access the first side of the data word in the memory.

20 Claims, 11 Drawing Sheets

(56) References Cited

U.S. PATENT DOCUMENTS

| | | | | |
|---|---|---|---|---|
| 5,977,889 A | * | 11/1999 | Cohen | H03M 7/30 |
| | | | | 341/87 |
| 2005/0038904 A1 | * | 2/2005 | Dougall | H04L 67/02 |
| | | | | 709/236 |
| 2009/0150632 A1 | * | 6/2009 | Harvey | G06F 12/08 |
| | | | | 711/170 |
| 2010/0306291 A1 | * | 12/2010 | Craske | G06F 5/00 |
| | | | | 708/209 |
| 2015/0364168 A1 | * | 12/2015 | Riley | G11C 5/025 |
| | | | | 711/5 |
| 2016/0239422 A1 | * | 8/2016 | Talukdar | G06F 12/0246 |
| 2016/0253104 A1 | * | 9/2016 | Romanovskiy | G06F 3/067 |
| | | | | 711/156 |
| 2017/0286308 A1 | * | 10/2017 | Verrilli | G06F 12/0875 |
| 2018/0210994 A1 | * | 7/2018 | Wuu | G06F 30/398 |
| 2018/0285280 A1 | * | 10/2018 | Akin | G06F 12/0888 |
| 2018/0300606 A1 | * | 10/2018 | Corkery | G06N 3/08 |
| 2019/0115933 A1 | * | 4/2019 | Chen | G06N 3/04 |
| 2020/0336155 A1 | * | 10/2020 | Ovsiannikov | H03M 7/00 |
| 2020/0336273 A1 | * | 10/2020 | Ovsiannikov | G06F 9/3818 |

OTHER PUBLICATIONS

Bramas B., et al., "Computing the Sparse Matrix Vector Product using Block-Based Kernels without Zero Padding on Processors with AVX-512 Instructions," PeerJ Computer Science, 2018, 23 pages.

International Search Report and Written Opinion for International Application No. PCT/US2020/034848, dated Aug. 31, 2020, 11 Pages.

Zaks M., "Smart Way of Storing Data," Towards Data Science, 2017, 8 pages.

* cited by examiner

SYSTEMS AND METHODS FOR READING AND WRITING SPARSE DATA IN A NEURAL NETWORK ACCELERATOR

CROSS-REFERENCE TO RELATED APPLICATION

This application is a continuation of U.S. patent application Ser. No. 16/509,138, filed Jul. 11, 2019, which is incorporated herein by reference in its entirety for all purposes.

FIELD OF DISCLOSURE

The present disclosure is generally related to handling of data of a neural network, including but not limited to systems and methods for reading and/or writing sparse data.

BACKGROUND

Computer systems can include a memory or memory component to store and maintain data. The memory can store and retrieve information and data through write and read operations. However, each time the memory system is accessed, the computer system utilizes various resources and various levels of power consumption to store or retrieve information and data.

SUMMARY

Devices, systems and methods for reading and writing sparse data in a neural network accelerator are provided herein. In some embodiments, sparsity of a data word can be determined, and the circuitry described herein can perform read and/or write operations for the respective data word based in part on the sparsity of the data word to reduce a power usage (or consumption) of the circuitry during the read and/or write operations. A memory can be partitioned into slices and the different portions (e.g., byte portions) of the data word can be written into or across one or more slices based in part on a byte value of the respective portions. For example, the circuitry can determine the number of byte portions of the data word having non-zero byte values and the number of byte portions having zero byte values. The byte portions having zero byte values can correspond to sparse portions of the data word or portions identified as having no (or an insignificant level of) information, value and/or importance. Thus, the systems and methods described herein can skip, ignore or not perform read/write access operations for one or more of the byte portions having zero byte values to reduce a power usage by the circuitry during the read/write access operations.

In some embodiments, the data word can be modified to group or arrange the byte portions of the data word having non-zero byte values and position the remaining byte portions having zero byte values after the byte portions of the data word having non-zero byte values. For example, the circuitry can pack all the non-zero byte portions to a first end or left side of a first slice in performing write operations. For read operations, the circuitry can first fetch a bit-mask identifying the number of byte portions of the data word having non-zero byte values and the number of byte portions having zero byte values and verify how many byte portions include non-zero byte values (e.g., to read from). In some embodiments, the circuitry can skip or ignore byte portions having zero byte values during read/write access to reduce a power usage by the circuitry. Thus, the systems and methods described herein can reduce an access level power value or read/write power for performing read and write operations.

In some embodiments, if each of the byte portions include zero byte values, the circuitry can skip or not perform the read/write access to the slices (e.g., both left and right slices). In some embodiments, if the bit mask value for a data word is less than or equal to an access size of a first slice, the circuitry can perform the read/write access to only the first slice. In some embodiments, if the bit mask value for a data word is greater than an access size of a first slice, the circuitry can perform the read/write access to the first slice and a second slice or multiple slices in addition to the first slice.

In at least one aspect, a method is provided. The method can include establishing, by circuitry, a plurality of slices to access a memory having an access size of a data word, a first slice of the plurality of slices configured to access a first side of the data word in memory. The first side can include a size less than that of the data word. The method can include accessing, by the circuitry, a mask identifying byte positions within the data word having non-zero values. The method can include modifying, by the circuitry, the data word to have non-zero byte values stored starting at an end of the first side, and any zero byte values stored in a remainder of the data word. The method can include determining, by the circuitry, whether a number of non-zero byte values starting at the end of the first side is less than or equal to a first access size of the first slice. The method can include writing, by the circuitry responsive to the determination, the modified data word to the memory via at least the first slice.

In some embodiments, the method can include generating the mask as one of a one-byte mask or a two-byte mask. The method can include determining, by the circuitry, the number of non-zero byte values of the first side is less than or equal to the first access size of the first slice. The method can include writing, by the circuitry, the first side of the modified data word only via the first slice. The method can include determining, by the circuitry, the number of non-zero byte values starting at the end of the first side is greater than the first access size of the first slice. The method can include writing, by the circuitry, the bytes of the first side of the modified data word via the first slice and remainder non-zero bytes via a second slice. In some embodiments, one of the first access size of the first slice or a second access size of a second slice of the plurality of slices can be selected to provide a predetermined reduction in power usage of the circuitry in accessing the memory. The method can include determining, by the circuitry, the number of non-zero byte values of the modified data word based on the mask.

In at least one aspect, a method is provided. The method can include establishing, by circuitry, a plurality of slices to access a memory having an access size of a data word. A first slice of the plurality of slices can be configured to access a first side of the data word in the memory. The first side can include a size less than that of the data word. The method can include accessing, by the circuitry, a mask identifying positions within the data word having non-zero values. The method can include determining, by the circuitry, from the mask a number of non-zero byte values of the data word is less than or equal to a first access size of the first slice. The method can include reading, by the circuitry responsive to the determination, a packed representation of the data word stored in memory via the first slice. The packed representation can include the non-zero byte values stored starting at an end of the first side of the data word and any zero byte values stored in a remainder of the data word. The method can include providing, by the circuitry from the packed representation, the data word having the non-zero byte values and the zero byte values at the positions indicated by the mask.

In some embodiments, the mask can identify the position of non-zero byte values on a one-byte basis or a two-byte basis. The method can include determining, by the circuitry, the number of non-zero byte values of the data word is less than or equal to the first access size of the first slice. The method can include reading, by the circuitry, the packed representation of the data word via only the first slice. The method can include determining, by the circuitry, the number of non-zero byte values of the data word is greater than the first access size of the first slice. The method can include reading, by the circuitry, a first side of the data word via the first slice and any remainder non-zero bytes via a second slice of the plurality of slices. In some embodiments, one of the first access size of the first slice or a second access size of a second slice of the plurality of slices can be selected to provide a predetermined reduction in power usage of the circuitry in reading from the memory.

In at least one aspect, a device is provided. The device includes a memory having an access size of a data word and circuitry. The circuitry can be configured to establish a plurality of slices to access the memory. A first slice of the plurality of slices can be configured to access a left side of a data word in the memory. The circuitry can be configured to access a mask identifying byte positions within the data word having non-zero values. The circuitry can be configured to modify the data word to have non-zero byte values stored starting at an end of a first side of the data word and any zero byte values stored in a remainder of the data word. The circuitry can be configured to determine a number of non-zero byte values of the left most bytes of the modified data word is less than or equal to a first access size of the first slice. The circuitry can be configured to write, responsive to the determination, the modified data word to the memory via at least the first slice.

In some embodiments, the circuitry can be configured to read, a packed representation of the data word stored in memory via at least the first slice. The packed representation can include the non-zero byte values stored in the first side of the data word and any zero byte values stored in a remaining bytes of the data word. The circuitry can be configured to create the data word to have the non-zero byte values and the zero byte values stored in the positions indicated by the bit mask. The circuitry can be configured to read the first side of the data word via the first slice and any remaining non-zero bytes via a second slice of the plurality of slices. In some embodiments, one of the first access size of the first slice or a second access size of a second slice of the plurality of slices can be selected to provide a predetermined reduction in power usage of the circuitry in reading from the memory.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for reading and writing sparse data in a neural network accelerator.

A. Environment for Artificial Intelligence Related Processing

Figure 1A:
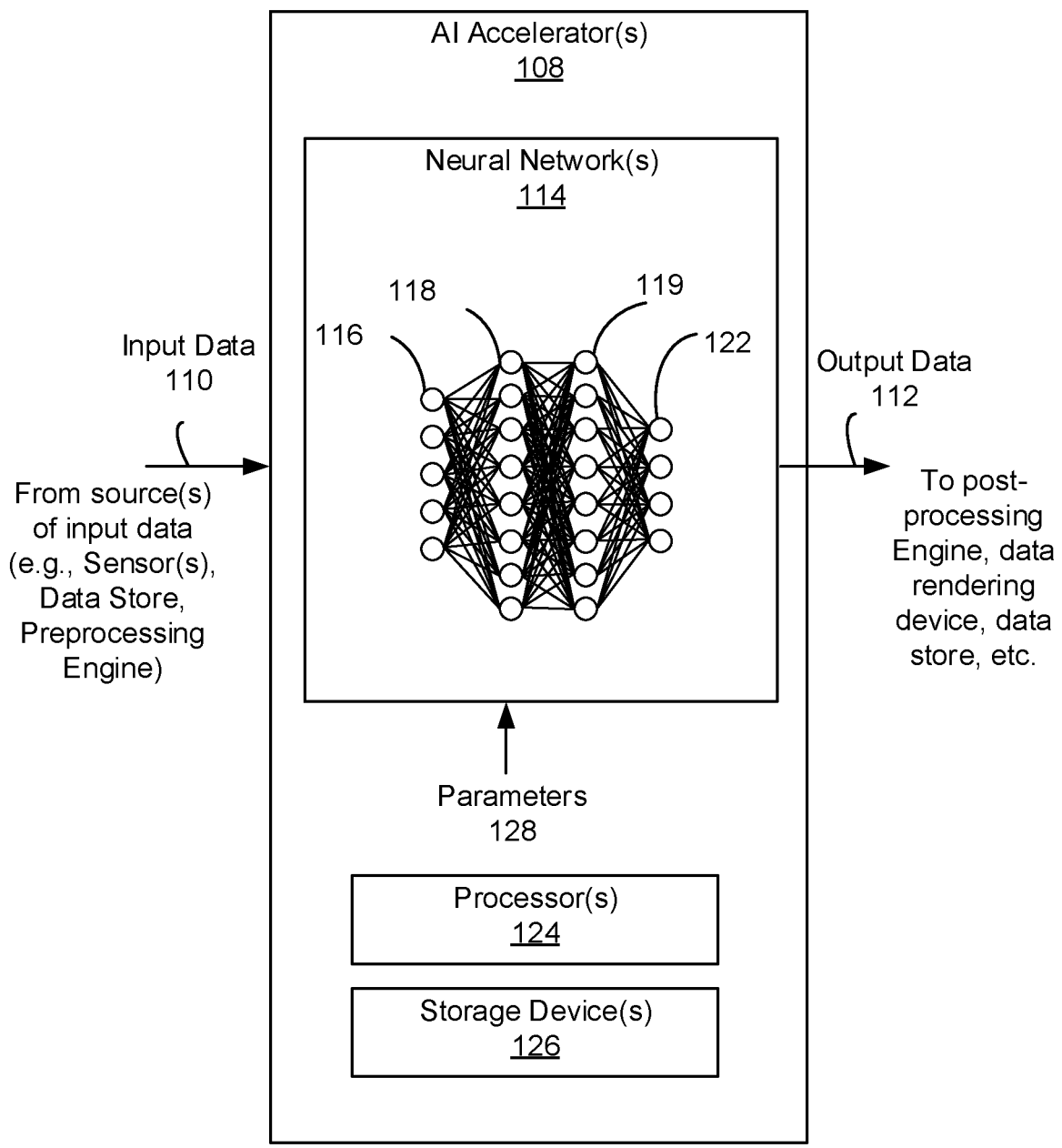
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) and/or one or more storage devices 12.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing the neural network using architectures for that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 114 differently for each neural network 114, or assigning different weights (e.g., hyperparameters, or learning rates), tensor flows, etc. Thus, by setting appropriate parameters 128 for the neural network(s) 114 based on a tuning or training process and the objective of the neural network(s) and/or the system, this can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represents some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduces the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108), sequential processing (e.g., on the same component of an AI accelerator 108, at different times), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics, internet of things and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
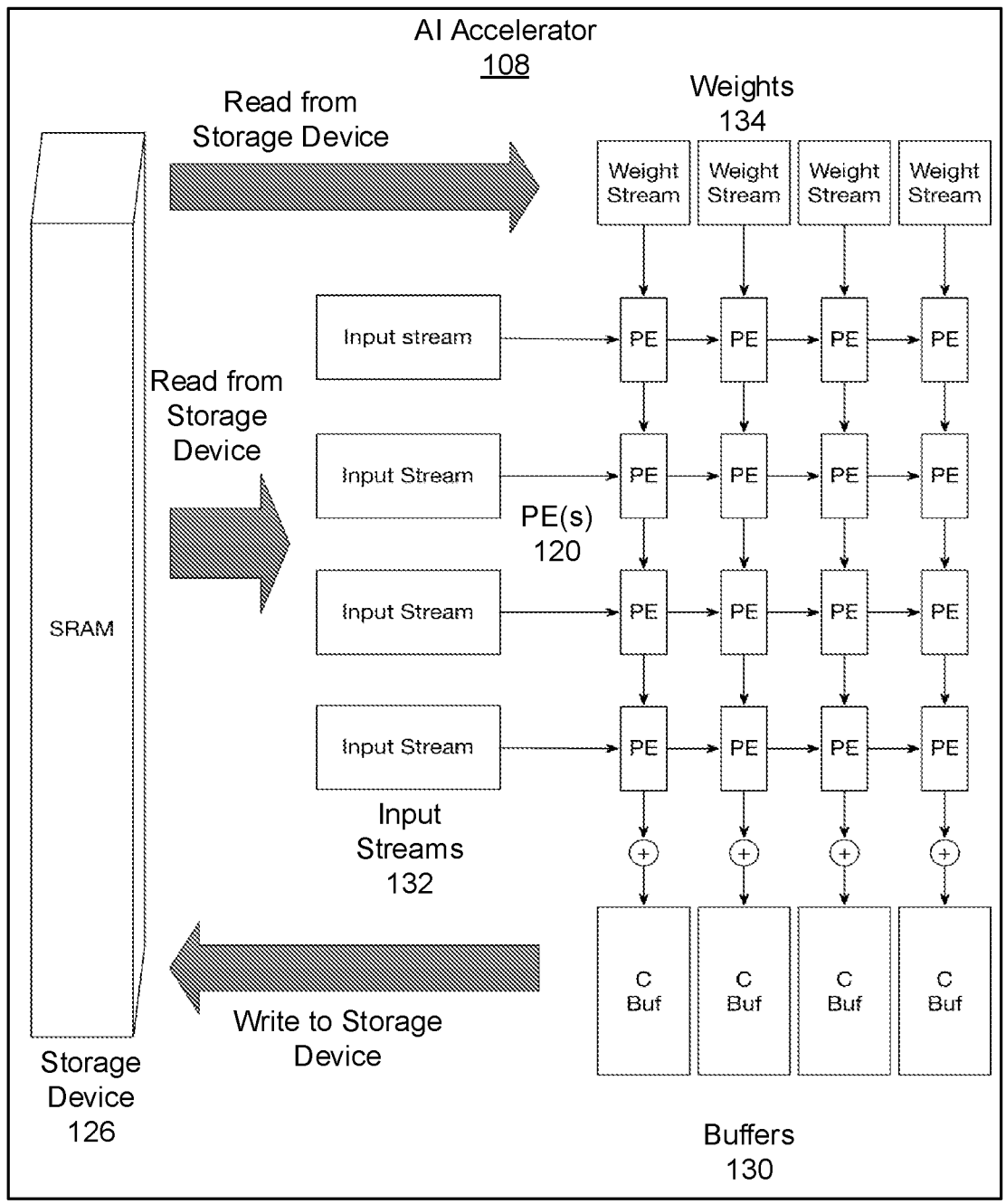
FIG. 1B is a block diagrams of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The PEs are connected into a particular network pattern or array, with different patterns serving different functional purposes. The PE in an artificial neural network operate electrically (e.g., in a semiconductor implementation), and may be either analog, digital, or a hybrid. To parallel the effect of a biological synapse, the connections between PEs can be assigned multiplicative weights, which can be calibrated or "trained" to produce the proper system output.

PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some network networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

Referring again to FIG. 1B, the input x to a PE 120 can be part of an input stream 132 that is read from a storage device 126 (e.g., SRAM). An input stream 132 can be directed to one row (horizontal bank or group) of PEs, and can be shared across one or more of the PEs, or partitioned into data portions (overlapping or non-overlapping portions) as inputs for respective PEs. Weights 134 (or weight information) in a weight stream 134 (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE, or routed through one or more PEs (e.g., along a row or column of PEs) to the target PE. The output of each PE can be routed directly out of the PE array, or through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored to the storage device 126 can be retrieved or read from the storage device 126, and be used as inputs to the array of PEs 120 for processing (of a subsequent layer of the neural network) at a later time. In certain embodiments, the outputs that are stored to the storage device 126 can be retrieved or read from the storage device 126 as output data 112 for the AI accelerator 108.

Figure 1C:
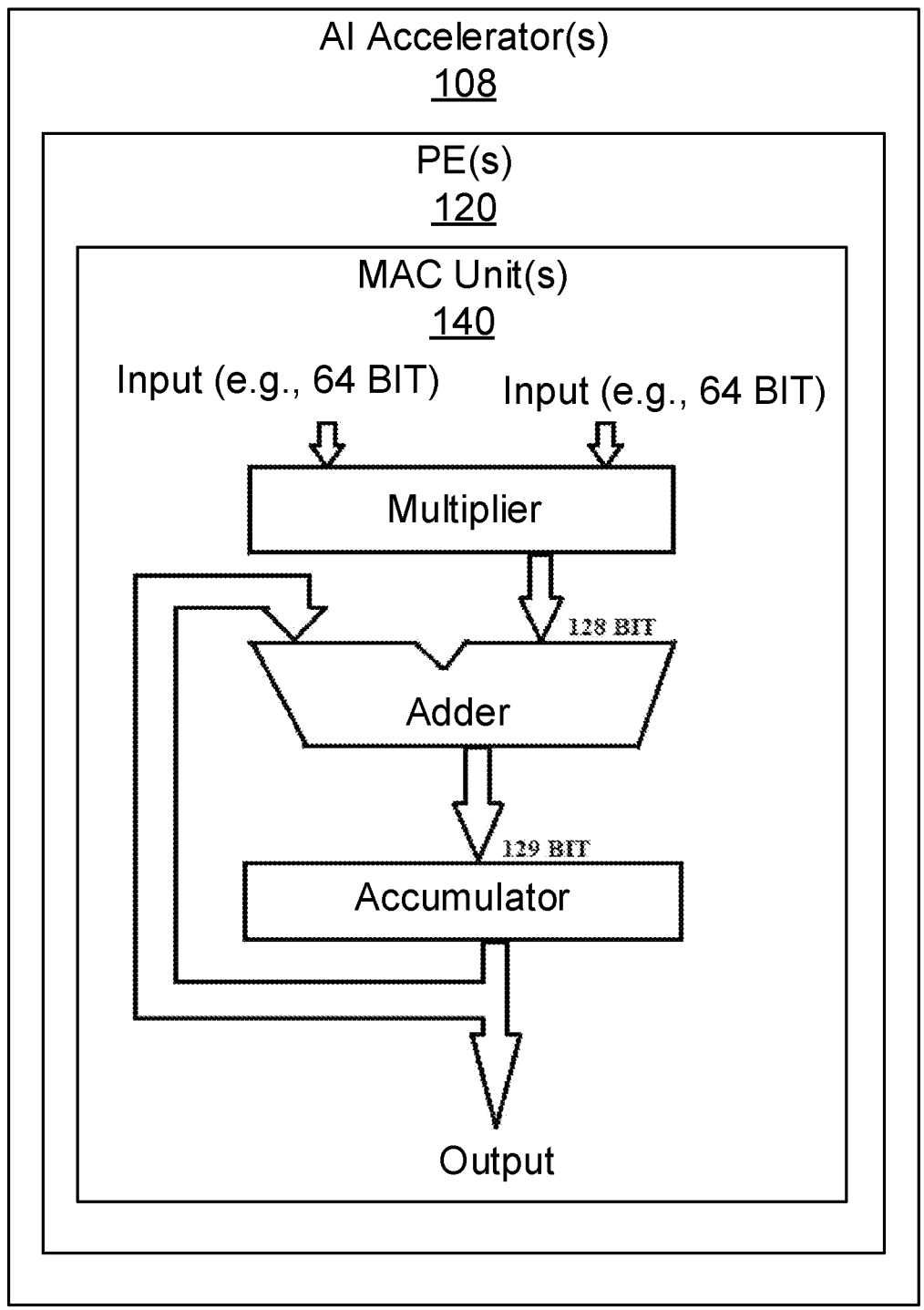
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator a, and inputs b and c:

$$a \leftarrow a+(b \times c) \qquad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator.

Figure 1D:
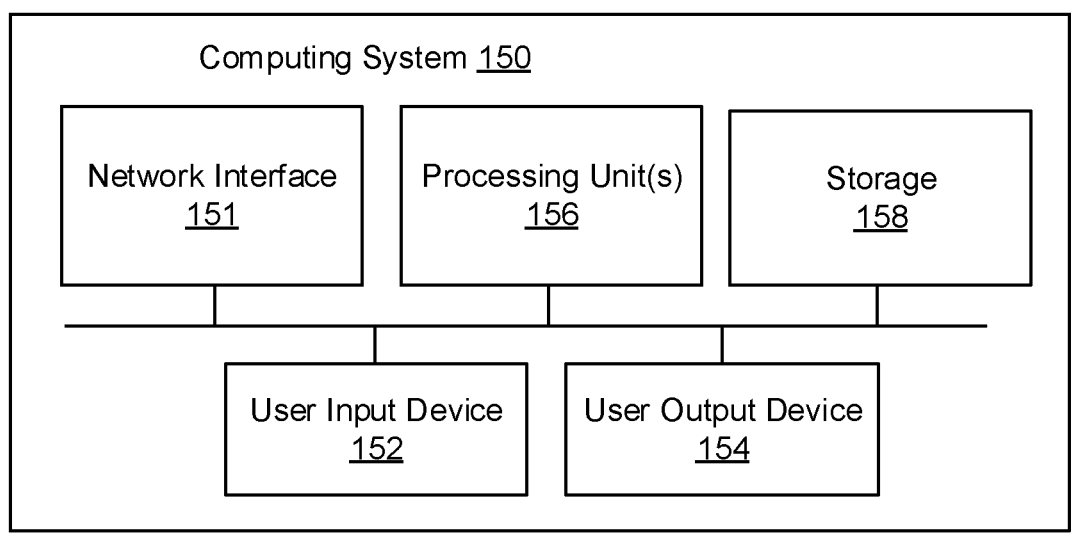
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 154 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Reading and Writing Sparse Data in a Neural Network Accelerator Disclosed herein include embodiments of a system, a method, and a device for reading and writing sparse data in a neural network accelerator. In some embodiments, data can be processed on a per word basis such that write and read functions are performed on the data using properties or profiles of the individual portions of the data. For example, a number of zero values and non-zero values can be determined for one or more different portions of a data word. The portions can include, but not limited to, byte data values or byte data portions of the data word. Circuitry described herein can determine to read or write the respective portions of the data word based in part on whether the respective portions correspond to zero values or non-zero values. In some embodiments, the circuitry can ignore or skip portions of the data word corresponding to zero values to reduce an access energy value or power consumption of the circuitry during read and/or write operations.

Reading and writing data can use large amounts of resources (e.g., hardware and software) of a computing system. Further, accessing memory to perform read and write operations can require large amounts of power consumption by the resources of the respective computing system. For example, accessing memory to read or write data can require a large amount of power on the respective circuitry to process all of the requested or received data. However, the data can include or be characterized by a level of sparsity and include portions that are unimportant, of no value, or may contain no data. For example, the data can include portions that correspond to zero byte values (e.g., no significant data in the respective portion) that do not have to be read or written to memory. Thus, by processing all of the requested or received data, the circuitry may use unnecessary amounts of power and system resources to read and write the important data (e.g., byte portions having non-zero values) and the unimportant data or sparse portions of a data word (e.g., byte portions having zero values).

In neural network processing applications, certain types and/or sources of data may be characterized as having sparse content or data. The methods, system and devices described herein can reduce a power usage for accessing memory by determined a sparsity of a respective data word. For example, the circuitry can determine portions of a data word that include non-zero byte values and portions of the data word that include zero byte values. A byte value can refer to a value of a byte (of any predefined number or length of bits) of data, and can indicate a collective value of all bits in the byte of data. A byte having a zero byte value may indicate that all bits in the byte are zero ("0"), low or null. A byte having a non-zero byte value may indicate that not all bits in the byte are zero ("0"), low or null; such that at least one of the bits is high, one ("1") or non-zero.

The memory (e.g., static random access memory (SRAM)) can be configured to have multiple slices or be portioned into multiple slices. For example, in an embodiment, a data word can include a 64-bit word with eight 1-byte data values. The memory can be configured or (e.g., logically or virtually) partitioned into multiples slices (e.g., three slices), which can include but are not limited to a 1-bit mask slice with a width of 8-bit, a first slice (e.g., left slice) with a width of 32-bit, and a second slice (e.g., right slice) with a width of 32-bit for example. The circuitry can re-organize the data word such that the portions having non-zero byte values start at a first end of the first slice and portions of the data word having zero byte values are stored after, subsequent to or following the portions with non-zero byte values.

For example, when writing a new data word, a bit-mask can be generated with each bit of the bit mask indicating whether a byte of the data word corresponds to a non-zero byte value or a zero byte value. In some embodiments, a bit-mask can be generated with a bit of the bit mask indicating that half of the bits (e.g., 4-bits) of a byte, or other fraction of a byte, or a predetermined number of (one or more) bytes of data, correspond to a non-zero value or a zero value. The circuitry can write the non-zero byte values starting at the first end (e.g., left end, left part) or other predetermined portion of the first slice. For read operations, the circuitry can retrieve the bit-mask corresponding to the data word and check the number of bytes of the data word that are non-zero byte values. The circuitry can read the non-zero byte values starting at the first end (e.g., left end, left part) or other predetermined portion of the first slice.

In some embodiments, the zero byte values can be ignored or skipped during write or read operations. For example, the circuitry can determine if the number of non-zero byte values is less than or equal to a size of a first slice. If the number of non-zero byte values is less than or equal to the size of the first slice, the circuitry can ignore or skip the write or read operations for the zero byte values. If the number of non-zero byte values is greater than the size of the first slice, the circuitry can access at least the first and second slices for write or read operations for the zero byte values and the non-zero byte values.

Figure 2A:
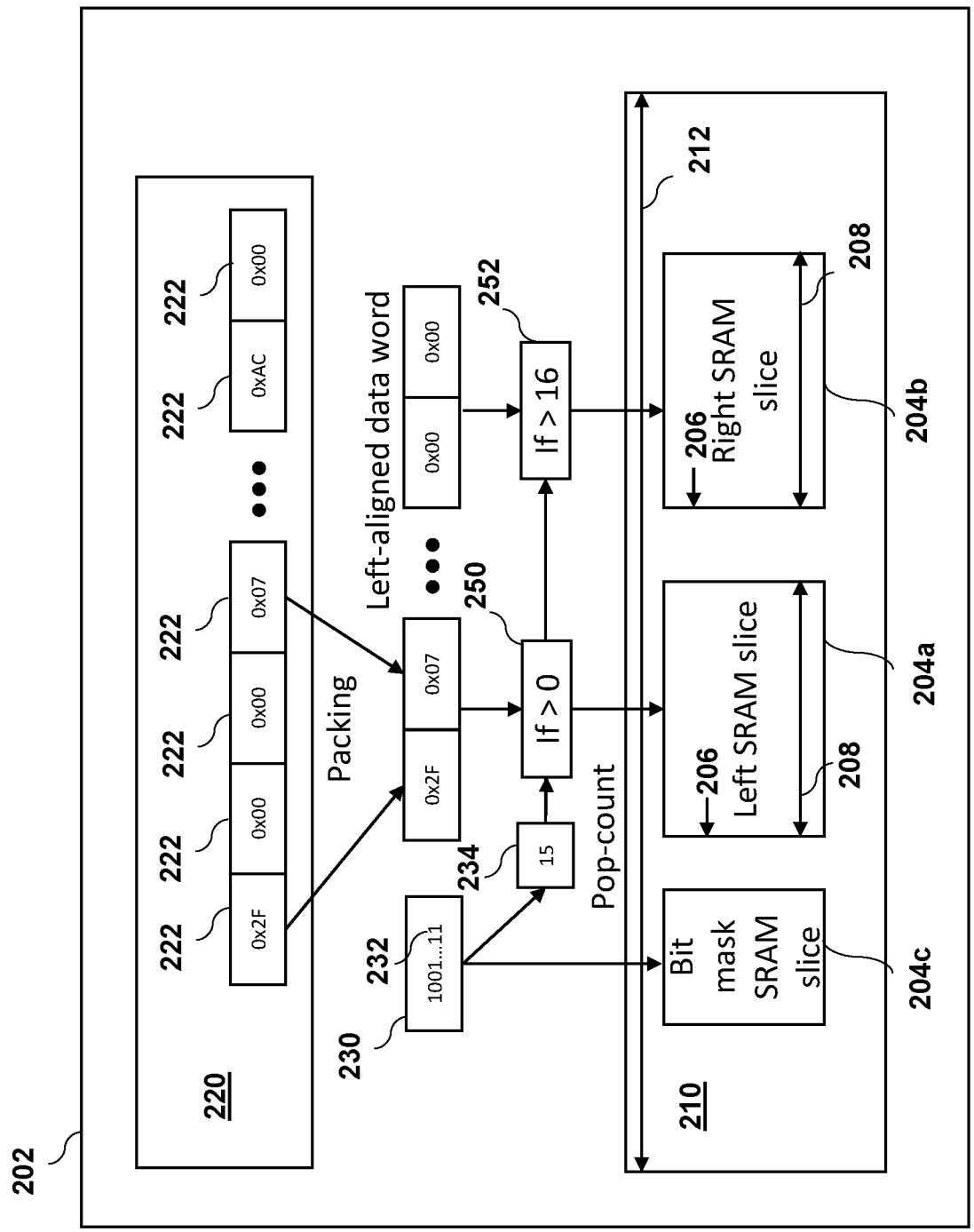
FIG. 2A is a block diagram of a system for writing sparse data in a neural network accelerator are provided herein, according to an example implementation of the present disclosure.
Figure 2B:
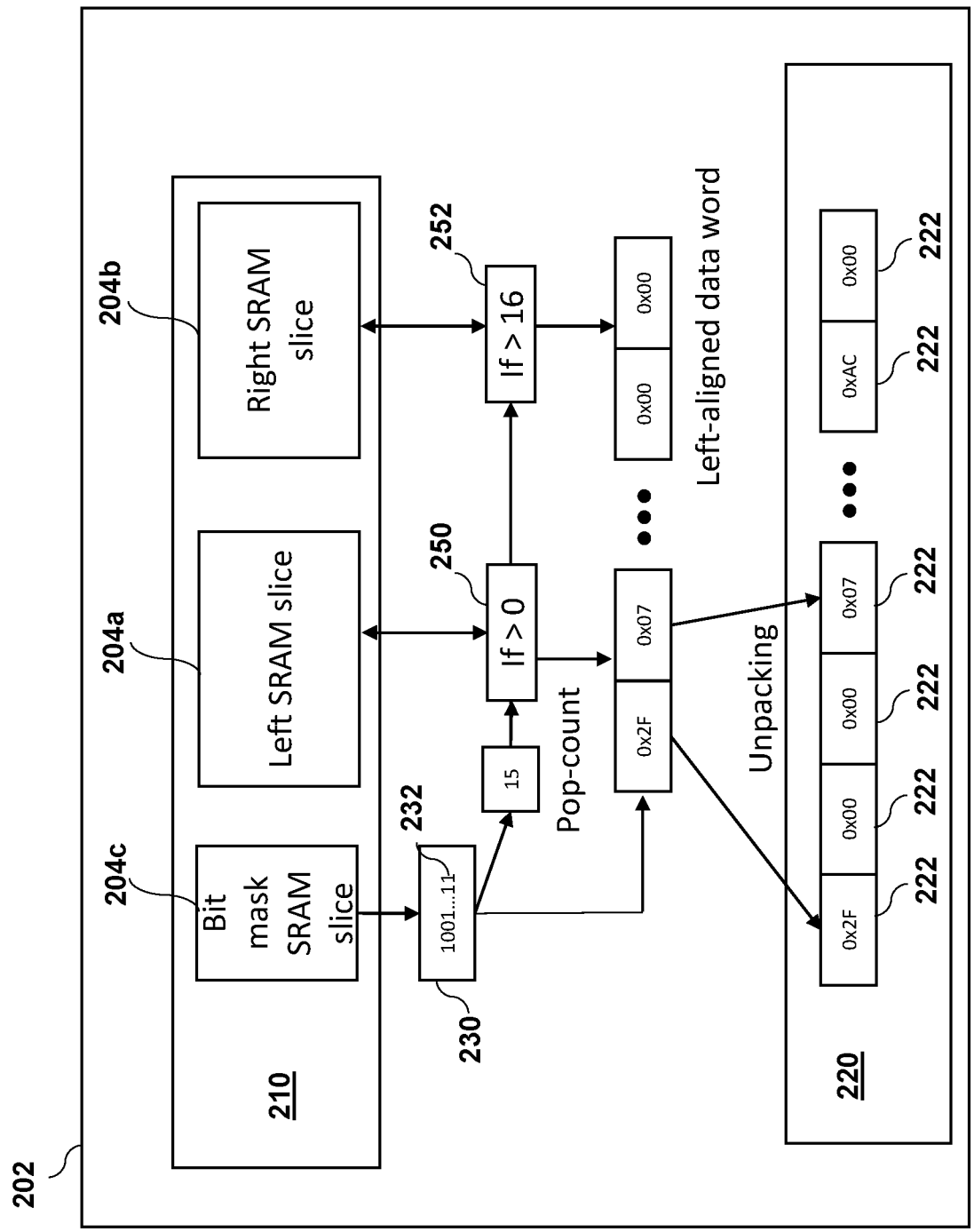
FIG. 2B is a block diagram of a system for reading sparse data in a neural network accelerator, according to an example implementation of the present disclosure.

Referring now to FIGS. 2A-2B, embodiments of a system for reading and writing sparse data in a neural network accelerator (e.g., AI accelerator 108 of FIG. 1A) is depicted. In brief overview, FIG. 2A shows a system for writing a data word 220 to a memory 210. The system can include circuitry 202 having memory 210 to access for read and write operations. The memory 210 can be partitioned or configured into multiple slices 204 with each of the slices having a predetermined size 208 or storage capacity. The circuitry 202 can access the slices 204 of the memory 210 to write bytes 222 of a data word 220 or read bytes 222 of a data word 220.

The circuitry 202 can include a processor such as but not limited to processor(s) 124 described above with respect to FIG. 1A. The circuitry 202 can be a component of or part of computing system 150 described above with respect to FIG. 1D. The memory 210 can include a static random access memory (SRAM) or any other types of memory, storage drive or storage register. In some embodiments, the memory 210 can include, be the same as or substantially similar to storage device 126 of FIGS. 1A-1B or storage 158 of FIG. 1D. The memory 210 can be partitioned into multiple slices 204a-204n. The slices 204 can each correspond to a portion or segment of the memory 210, and one or a range of addresses of the memory 210. The slices 204 can be smaller or have a size that is less than a total size of the memory 210. For example, the memory 210 can include or have a size or access size 212 corresponding to a plurality of bits. Each of the slices 204 can have a size 208 that is less than the access size 212 of the memory. The bit capacity or byte capacity of each slice 204 can be less than a bit capacity or byte capacity of the memory 210. In some embodiments, the slices 204 can have the same size 208 (e.g., have the same bit or storage capacity). In some embodiments, one or more slices 204 can have a different size 208 from a size 208 of one or more other or different slices 204 (e.g., different bit or storage capacity). The memory 210 can, as a non-limiting example, include two slices 204a-204b. The memory 210 can include three slices 204a-204c, for instance. The memory 210 can include more than three slices 204a-204n.

In some embodiments, the memory 210 can include a bit mask slice 204c. The bit mask slice 204c can store a bit mask 230. In some embodiments, the bit mask slice 204c can be part of a different slice (e.g., left slice, first slice). For example, the circuitry 202 can store a bit mask indicator corresponding to the bit mask 230 for a data word 220 instead of having a separate or independent bit mask slice 204c. The bit mask 230 can represent properties or a profile of a data word 220. The bit mask 230 can include a plurality of bits 232 with each bit corresponding to at least one byte portion 222 of a data word 220. For example, the bits 232 of the bit mask can identify a position of at least one byte 222 of the data word in the data word (e.g., relative to positions of other bytes 222 of the data word).

The memory 210 can include a counter 234. The counter 234 can include or correspond to a population count (e.g., a bit counter implemented to count a number of non-zero bits in the bit mask). The counter 234 can include a value corresponding to (or indicative of) a number of bytes 222 of a data word 220 having non-zero byte values. For example, the value of the counter 234 can be the same as or equal to the number of non-zero byte values of the data word 220.

In some embodiments, and as shown in FIG. 2A, the circuitry 202 can receive the data word 220 having a plurality of bytes 222 or byte portions 222. The byte portions 222 can include non-zero byte values or zero byte values. For example, each of the byte portions 222 can include a plurality of bits (e.g., eight bits). In some embodiments, the values of the bits of a respective byte portion 222 can include, add up to or sum to a non-zero byte value (e.g., 1). In some embodiments, the values of the bits of a respective byte portion 222 can include, add up to or sum to a zero byte value (e.g., 0).

The circuitry 202 can modify, re-arrange, re-order, re-sequence or otherwise re-position the byte portions 222 such that the byte portions 222 having non-zero byte values are grouped together or packed together to form a modified data word or packed representation 224 of the data word 220. The circuitry 202 can modify or re-position the byte portions 222 such that the byte portions 222 having zero byte values are grouped together or packed together.

The circuitry 202 can generate or populate the bits 232 of the bit mask 230 to indicate whether a corresponding byte portion 222 of the data word includes non-zero byte values or zero byte values. In some embodiments, the circuitry can generate or populate the bits 232 of the bit mask 230 to each indicate that a group of bits or bytes (e.g., half of the bits (e.g., 4-bits) of a respective byte portion 222, or some other fraction, subset or number of bits of a respective byte portion 222, or a predetermined number of byte portions 222) of the data word 220) has a non-zero value or a zero value. The counter 234 or population count 234 for the data word 220 that indicates the total amount or number of byte portions 222 that include non-zero values can be determined. For example, the circuitry 202 can assign a value of "1" to a bit 232 of the bit mask 230 if the corresponding byte portion 222 includes non-zero byte values, and the circuitry can assign a value of "0" to a bit 232 of the bit mask 230 if the corresponding byte portion 222 includes zero byte values. The processor can (arithmetically) sum or add all assigned values of the bit mask 230 to provide a total value corresponding to the counter 234. The circuitry 202 can compare the counter 234 to a write threshold 250 to determine whether to write the data word 220 or skip, ignore or otherwise not write the data word 220. For example, if the data word 220 has a population count 234 of zero or does not include any non-zero byte values, the circuitry 202 can skip, ignore or otherwise not write the data word 220 to memory. In one embodiment, the write threshold can be zero. Write operations are performed if the counter 234 exceeds the write threshold, in some embodiments. If the population count 234 of the data word 220 is greater than the write threshold 250, the circuitry 202 can compare the population count 234 to an access size threshold 252 of a slice 204. In some embodiments, the access size threshold 252 can correspond to a size 208 of a first slice 204 of the plurality of slices 204. The access size threshold 252 can be used to determine how many slices 204 of the plurality of slices 204 is to be used to write the data word 220 to memory 210. If the population count 234 is less than or equal to the access size threshold 252 of the first slice 204, the circuitry 202 can write the byte portions 222 having non-byte values to the first slice 204 of the plurality of slices 204. The circuitry 202 can write the byte portions 222 having non-zero byte values to the first slice 204 starting at a first position of a first side 206 of the first slice 204, and write these byte portions 222 in an order abutting each other, corresponding to the order of these byte portions 222 (e.g., in the same order relative to each other) in the original format or arrangement of the data word 220.

If the population count 234 is greater than the access size threshold 252 of the first slice 204, the circuitry 202 can write the byte portions 222 having non-byte values to the first slice 204 and a second slice 204 of the plurality of slices 204, or to multiple slices 204 of the plurality of slices 204. For example, the circuitry 202 can write the byte portions 222 having non-byte values to the first slice 204 starting at a first position of a first side 206 of the first slice 204 until the first slice is full or at capacity, and write remaining byte portions 222 to a second slice 204 or multiple slices 204 beyond the first slice 204 in an order corresponding to the order of the byte portions 222 in the original format of the data word 220. This can be referred to as a packing process for a data word 220.

In some embodiments, the circuitry 202 can ignore, skip, bypass or not write the byte portions 222 of the data word 220 having zero byte values as indicated in the bit mask 230. The circuitry 202 can ignore, skip, bypass or not write some of the byte portions 222 of the data word 220 having zero byte values as indicated in the bit mask 230, and write one or more of the byte portions 222 of the data word 220 having zero byte values to a slice 204 having at least one byte portion 222 with a non-zero byte value (e.g., to fully populate the slice 204). In some embodiments, the circuitry 202 can ignore, skip or not write each of the byte portions 222 of the data word 220 having zero byte values as indicated in the bit mask 230. For example, the circuitry 202 can reduce a power usage for write operations by writing only the byte portions 222 having non-zero byte values and ignoring or not writing byte portions 222 having zero byte values. In some embodiments, the circuitry 202 can reduce an energy consumption value or a power usage of the circuitry 202 for write operations by writing only the byte portions 222 having non-zero byte values and ignoring or not writing byte portions 222 having zero byte values.

Referring now to FIG. 2B, a system for reading a data word 220 from memory 210 is provided. The data word 220 can include a packed representation 224 of the data word 220 written to memory 210 in FIG. 2A. For example, the packed representation 224 of the data word 220 can include or correspond to a modified data word 220 having the byte portions 222 having non-zero byte values grouped together or written in order in one or more slices 204 of the memory 210. To read the packed representation 224 of the data word 220 from the memory 210, the circuitry can use the bit mask 230 to determine the byte portions 222 of the data word 220 having non-zero byte values and the byte portions 222 of the data word having zero byte values. For example, the circuitry 202 can access the bit mask 230 and use the values of the individual bits 232 to determine the values of the corresponding byte portions 222 of the data word. The circuitry 202 can compare the population count 234 of the data word 220 to the write threshold 250 to determine if the data word 220 includes any byte portions 222 having non-zero byte values. The circuitry 202 can compare the population count 234 of the data word 220 to the access size threshold 252 to determine how many slices 204 to which the byte portions 222 of the data word 220 are written to in memory 210.

The circuitry 202 can read the packed representation 224 of the data word 220 stored in one or more slices 204 of the memory 210. For example, the circuitry 202 can read the packed representation 224 of the data word 220 stored in memory 210 via the first slice 204 or via multiple slices 204

(e.g., first slice and second slice). The packed representation 224 can include the byte portions 222 having non-zero byte values stored starting at an end of the first side 206 (e.g., left side or most-significant bits portion) of the data word 220 and any zero byte values stored in a remainder of the data word 220 (e.g., right side or least-significant bits portion). The circuitry 202 can unpack the packed representation 224 of the data word 220 to restore the data word 220 to an original format or an original order (of byte portions 222) corresponding to the format of the data word 220 when the data word 220 was received prior to being written to memory 210. For example, the circuitry 202 can use the bit mask 230 to determine the original positions of each of the byte portions 222 of the data word 220. The circuitry 202 can use the bit mask 230 to determine whether the byte portions 222 of the data word 220 include non-zero byte values or zero byte values. The circuitry 202 can read back, unpack or rebuild the data word 220 to the original format based on the order of the bits 232 of the bit mask 230.

Figure 2C:
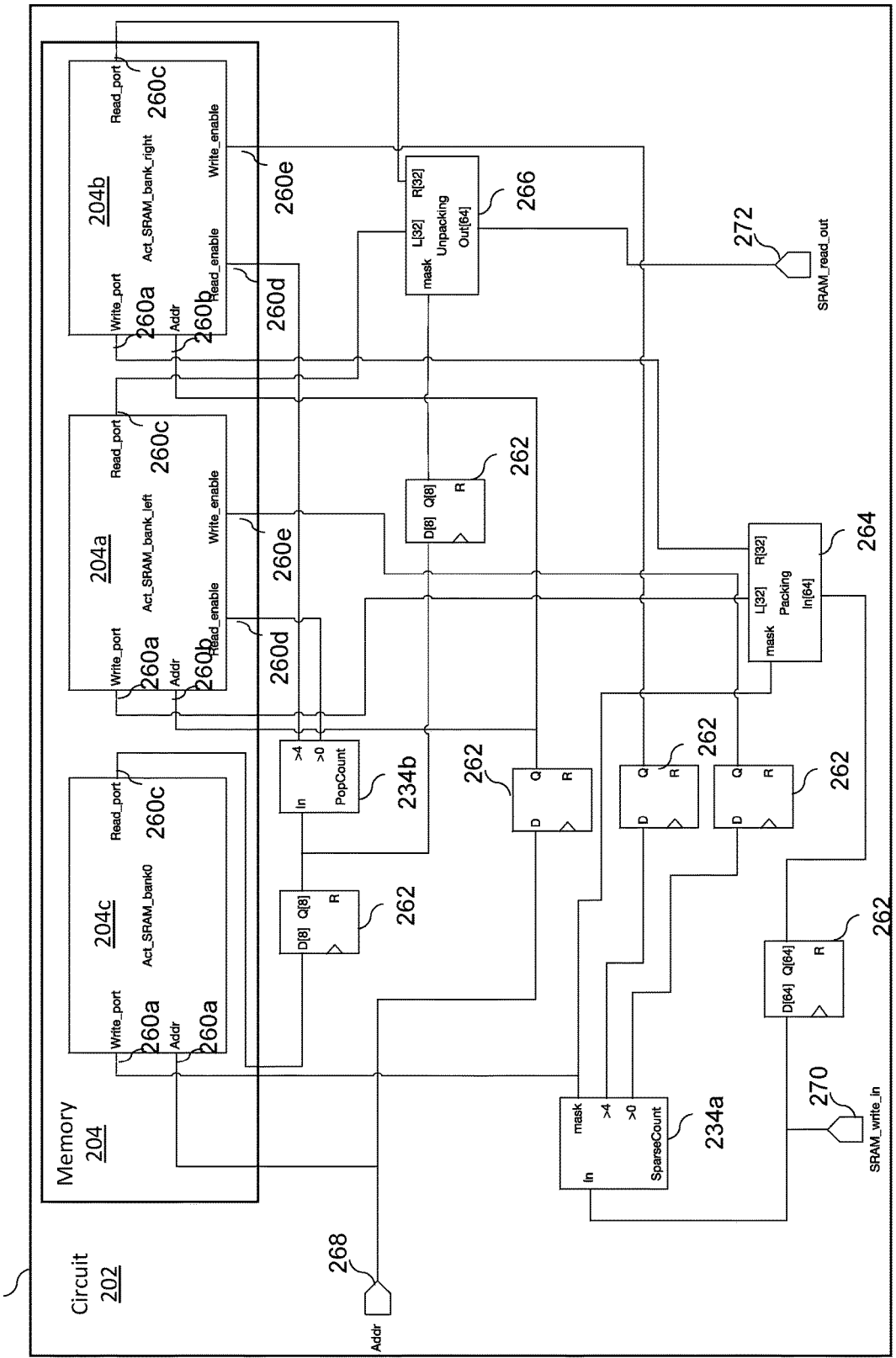
FIG. 2C is a block diagram of a system for reading and writing sparse data in a neural network accelerator, according to an example implementation of the present disclosure.

Referring now to FIG. 2C, an embodiment of the system 200 for reading and writing sparse data in a neural network accelerator is depicted. The system 200 includes circuitry 202 having memory 210 to access, for read and write operations. In the embodiment illustrated in FIG. 2C, the memory 210 is portioned, partitioned or configured into three slices, a first slice 204a, a second slice 204b and a bit mask slice 204c. In other embodiments, the memory 210 can include less than three slices or more than three slices 204. The circuitry 202 can access the slices 204 of the memory 210 to write bytes 222 of a data word 220 or read bytes 222 of a data word 220.

Each of the slices 204 can include multiple ports 260 to receive or transmit signals. For example, the slices 204 can include a first port 260a or a write port to receive, write and/or store portions of a data word 220, or perform a write operation. The slices 204 can include a second port 260b or an address port to receive address data for the data word 220 and/or the byte portions 222 of the data word 220. The slices 204 can include a third port 260c or a read port to read out portions of a data word 220, or perform a read operation (e.g., output content or bytes of the memory slice). In some embodiments, the slices 204 can include a fourth port 260d or a read enable port to enable the respective slice 204 for read operations. In some embodiments, the slices 204 can include a fifth port 260e or a write enable port to enable the respective slice 204 for write operations.

The circuit 202 can include a plurality of circuit or signal elements to transmit or provide control signals to the slices 204 to initiate read or write operations for memory 210. For example, the circuit 202 can include a plurality of register or latch elements 262 to enable and disable the slices 204 for read and write operations responsive to an input provided to the respective latch element 262. The circuit 202 can include an address signal input 268, a write input 270 to write a data word 220 or portions of a data word 220 to memory 210, and a read output 272 to provide a data word 220 or portions of a data word from memory 210. The address signal input 268 can couple with an address port 260b of the bit mask slice 204c, an address port 260b of the first slice 204a via at least one latch 262, and a second port 260b (e.g., address port) of the second slice 204b or multiple slices 204 via at least one latch 262.

For write operations, the circuit 202 can receive a write signal through the write input 270 of the circuit 202. In some embodiments, the write signal can include a write instruction, a data word 220 to be written to one or more slices 204 and/or portions of a data word 220 to be written to one or more slices 204. The write input 270 can couple with an input of a sparse counter 234a and an input of a packing element 264. The sparse counter 234a can count or determine a number of byte portions 222 of a data word 220 having non-zero byte values and generate a counter signal to enable one or more slices for write operations. For example, the sparse counter 234a can generate a write counter signal responsive to the write signal from the write input 270 of the circuit 202. The sparse counter 234a can include a counter value that corresponds to the number of number of byte portions 222 of the data word 220 having non-zero byte values. In some embodiments, the counter value of the sparse counter 234a can be incremented, for example by a value of 1, for each byte portion 222 of the data word 220 having non-zero byte values. The sparse counter 234a can provide the write counter signal to the fifth port 260e (e.g., write enable port) of the first slice 204a responsive to the counter value being greater than a write threshold (e.g., greater than zero). The sparse counter 234a can provide the write counter signal to the fifth port 260e (e.g., write enable port) of the second slice 204b or to multiple slices 204 responsive to the counter value being greater than an access size threshold of the first slice 204a. The sparse counter 234a can provide a mask signal to a bit mask slice 204c and/or to the packing element 264 indicating a bit mask 230 value of a data word 220.

The packing element 264 can generate a packing signal responsive to the mask signal from the sparse counter 234a indicating that the respective data word 220 to be written includes one or more byte portions having non-zero byte values, and the write signal from the circuit write input 270. The packing element 264 can provide the packing signal and/or write signal to the first ports 260a (e.g., write ports) of the slices 204 to initiate or perform a write operation for the respective slices 204. In some embodiments, the packing signal can include one or more byte portions 222 of a data word 220 to be written to the respective slice 204 receiving the packing signal.

For read operations, the bit mask slice 204c can generate a read signal and provide the read signal to a population counter 234b and/or an unpacking element 266. For example, the third port 260c (e.g., read port) of the bit mask slice 204c can couple with an input of the population counter 234b and the unpacking element 266 via at least one register or latch element 262. The population counter 234b can generate a read counter signal responsive to the read signal from the third port 260c (e.g., read port) of the bit mask slice 204c via at least one latch element 262. The population counter 234b can include a counter value that corresponds to the number of number of byte portions 222 of the data word 220 having non-zero byte values. In some embodiments, the counter value of the population counter 234b can be incremented, for example by a value of 1, for each byte portion 222 of the data word 220 having non-zero byte values. In some embodiments, the counter value of the population counter 234b can be the same as the counter value of the sparse counter 234a. The population counter 234 can provide the read counter signal to the fourth port 260d (e.g., read enable port) of the first slice 204a responsive to the counter value being greater than a read threshold (e.g., greater than zero).

The population counter 234 can provide the read counter signal to the fourth port 260d (e.g., read enable port) of the second slice 204b or to multiple slices 204 responsive to the counter value being greater than an access size threshold of the first slice 204a. The read counter signal can enable the respective slices 204 to begin a read operation. The third port 260c (e.g., read port) of the first slice 204a can couple with an input of the unpacking element 266 to provide a packed representation 224 of the data word 220 or portions of a packed representation 24 of the data word 220 stored in the first slice 204a to the unpacking element 266. The third port 260c (e.g., read port) of the second slice 204b or multiples slices 204 can couple with at least one input of the unpacking element 266 to provide portions of the packed representation 224 of the data word 220 stored in the second slice 204b or multiple slices 204 to the unpacking element 266. The unpacking element 266 can be configured to unpack, rebuild or modify the packed representation 224 of the data word 220 to read out the data word 220 in original format or in a format the respective data word 220 was in prior to being written to memory 210. An output of the unpacking element 266 can couple with the read output 272 of the circuit 202 to provide the data word 220 in original format or in a format the respective data word 220 was in prior to being written to memory 210.

Figure 2D:
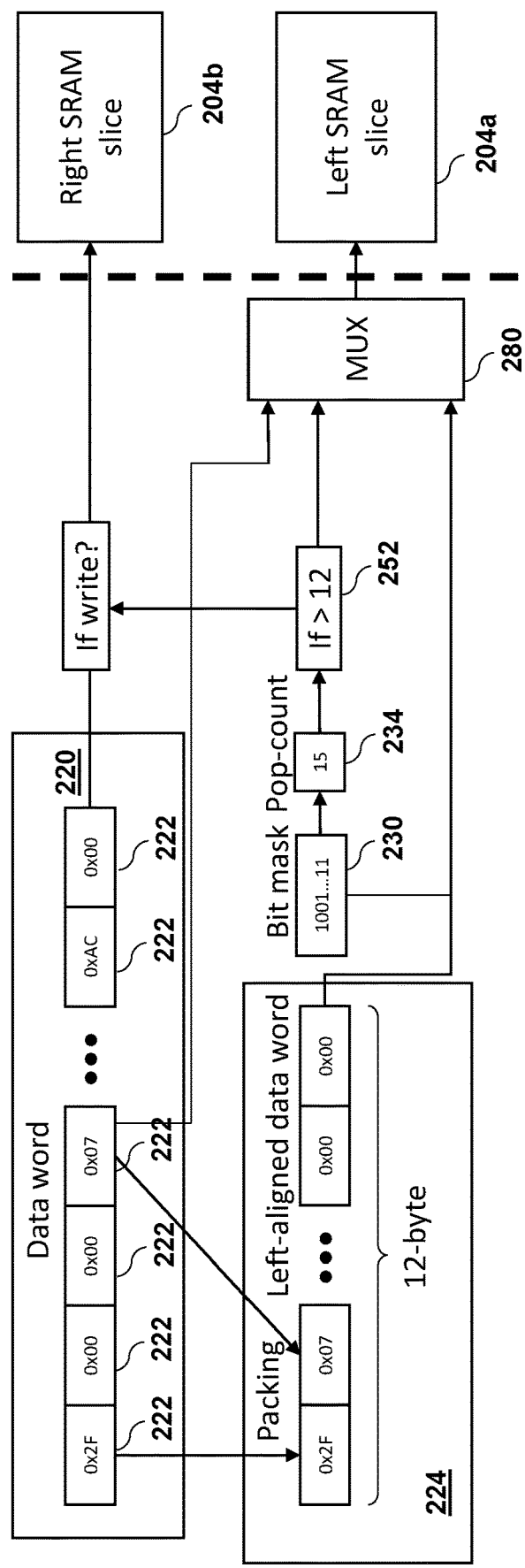
FIG. 2D is a block diagram of a system for writing sparse data in a neural network accelerator, according to an example implementation of the present disclosure.

Referring now to FIG. 2D, a first hybrid mode write operation is provided. In FIG. 2D, the write operation can include using a multiplexer 280 to write a data word 220 to a first slice 204 of a plurality of slices 204 of memory 210. The multiplexer 280 can include multiple inputs, such as but not limited to, a combination of two or more of a bit mask 230, a packed representation 224 of a data word 220, the data word 220, and byte portions 222 of the data word 220 having non-zero byte values. The multiplexer 280 can receive the multiple inputs and provide a single output corresponding to or representing the packed representation 224 of the data word 220 (e.g., multiplexed packed representation). For example, in some embodiments, the multiplexer 280 can receive the bit mask 230 or bits 232 of the bit mask 230 and the packed representation 224 of the data word 220 can generate a single output, a multiplexed packed representation 224 that includes, corresponds to or represents the bit mask 230 and the packed representation 224 of the data word 220. The circuitry 202 can write the multiplexed packed representation 224 of the data word 220 to the first slice 204a of the plurality of slices 204. Thus, the circuitry 202 can write the bit mask 230 into the first slice 204a and not establish an individual or separate slice for the bit mask 230.

In some embodiments, circuitry 202 can determine the population count 234 for the data word 220 using the bit mask 230. The circuitry 202 can compare the population count 234 to an access size threshold 252 of the first slice 204a of the plurality of slices 204. If the population count 234 is less than or equal to the access size threshold 252 of the first slice 204a, the circuitry 202 can write the multiplexed packed representation 224 of the data word 220 to the first slice 204a beginning with a first position or end of a first side 206 of the first slice 204a. If the population count 234 is greater than access size threshold 252 of the first slice 204a, the circuitry 202 can write the multiplexed packed representation 224 of the data word 220 to the first slice 204a beginning with a first position or end of a first side 206 of the first slice 204a and write the remaining byte portions 222 of the data word 220 to a second slice 204b and/or other slices 204 of the plurality of slices 204.

Figure 2E:
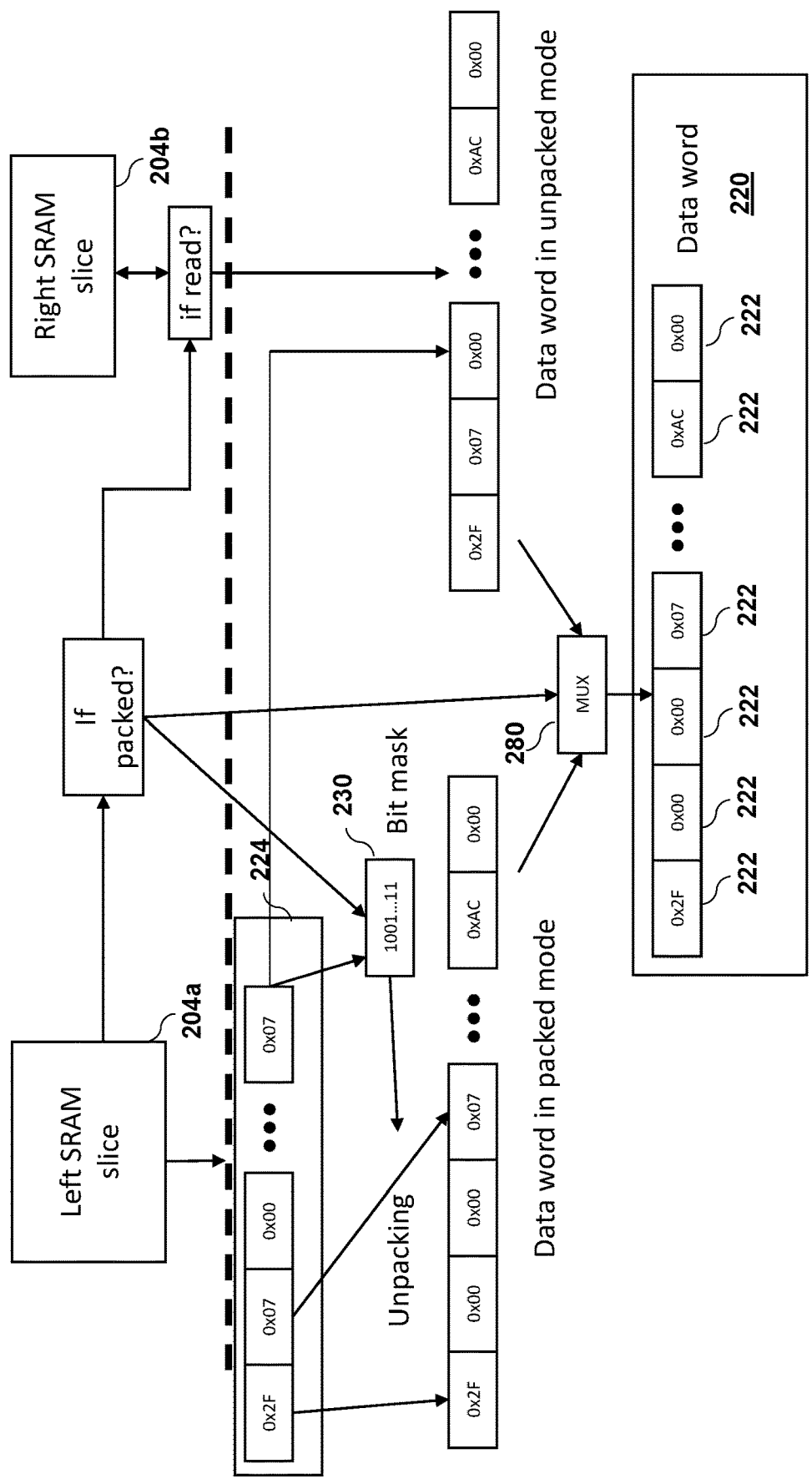
FIG. 2E is a block diagram of a system for reading sparse data in a neural network accelerator, according to an example implementation of the present disclosure.

Referring now to FIG. 2E, a first hybrid mode read operation is provided. In FIG. 2E, the read operation can include using a multiplexer 280 to unpack and output a data word 220. In some embodiments, the circuitry 202 can determine if the data word 220 is packed or not. If the data word 220 is packed, the circuitry 202 can access the bit mask 230 for the data word 220 to identify byte portions 222 within the data word 220 having non-zero byte values. The circuitry 202 can provide multiple inputs to the multiplexer 280 to unpack or rebuild the data word 220 to an original format. For example, the circuitry 202 can provide the packed representation 224 of the data word 220 as an input to the multiplexer from a first slice 204a or multiple slices 204. The circuitry 202 can provide the unpacked data word 220 as input to the multiplexer 280. The unpacked data word 220 can be accessed from a second slice 204b or a different slice 204 that the packed representation 224 of the data word 220 was written to. The circuitry 202 can provide an indication to the multiplexer 280 indication if the respective data word 220 was packed or not when written to memory 210. The circuitry 202 using the multiplexer 280 can unpack or rebuild the data word 220 to include byte portions 222 having non-zero byte values and byte portions 222 having zero byte values in their respective positions corresponding to the original positions of the byte portions 222 when the data word 220 was received or prior to the data word 220 being written to memory 210. The circuitry 202 can unpack the packed representation 224 of the data word 220 such that each of the byte portions 222 of the data word 220 are in the position indicated by the bit mask 230.

Figure 3A:
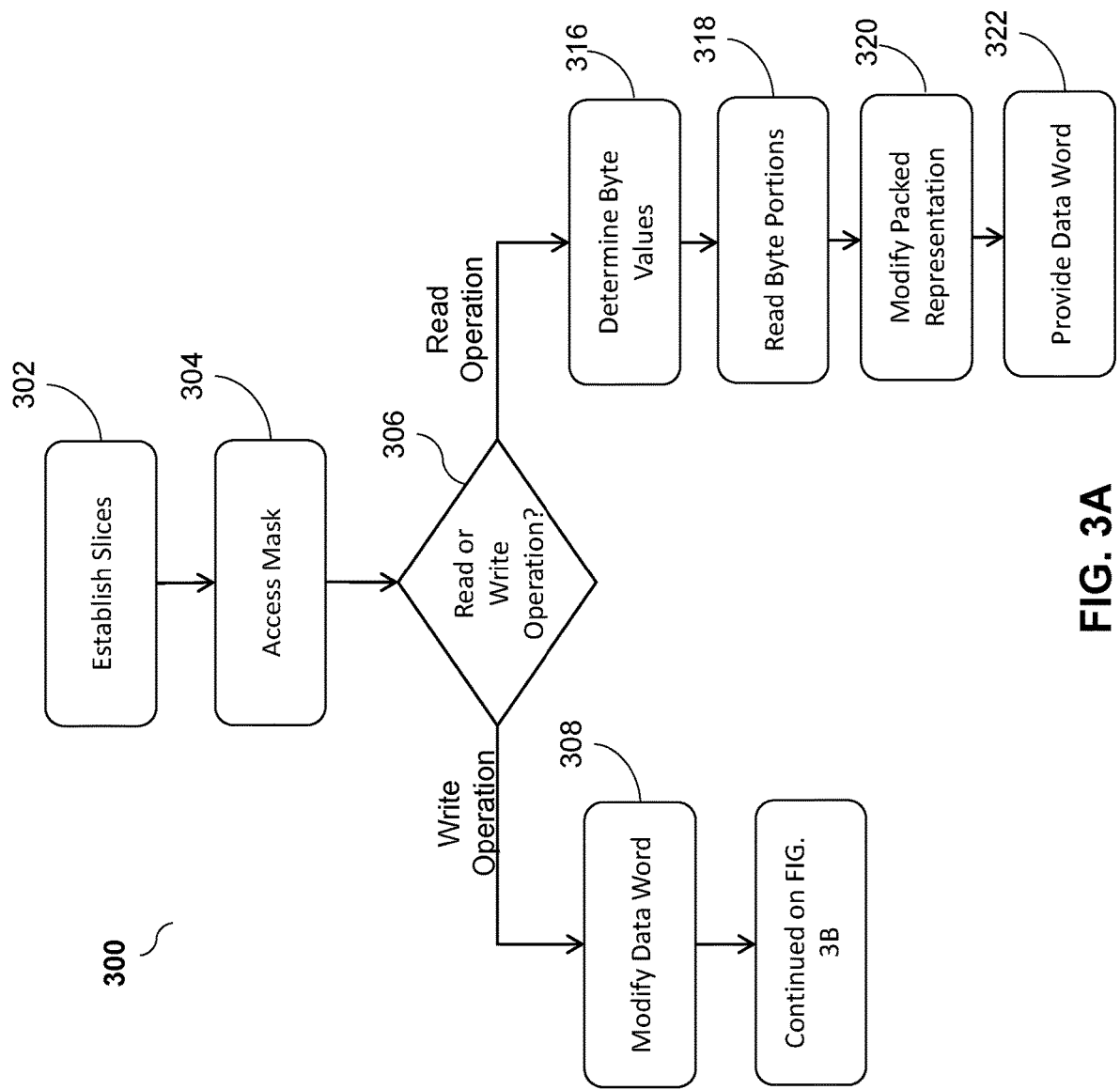
FIGS. 3A-3B is a flow chart illustrating a process or method for reading and writing sparse data in a neural network accelerator, according to an example implementation of the present disclosure.
Figure 3B:
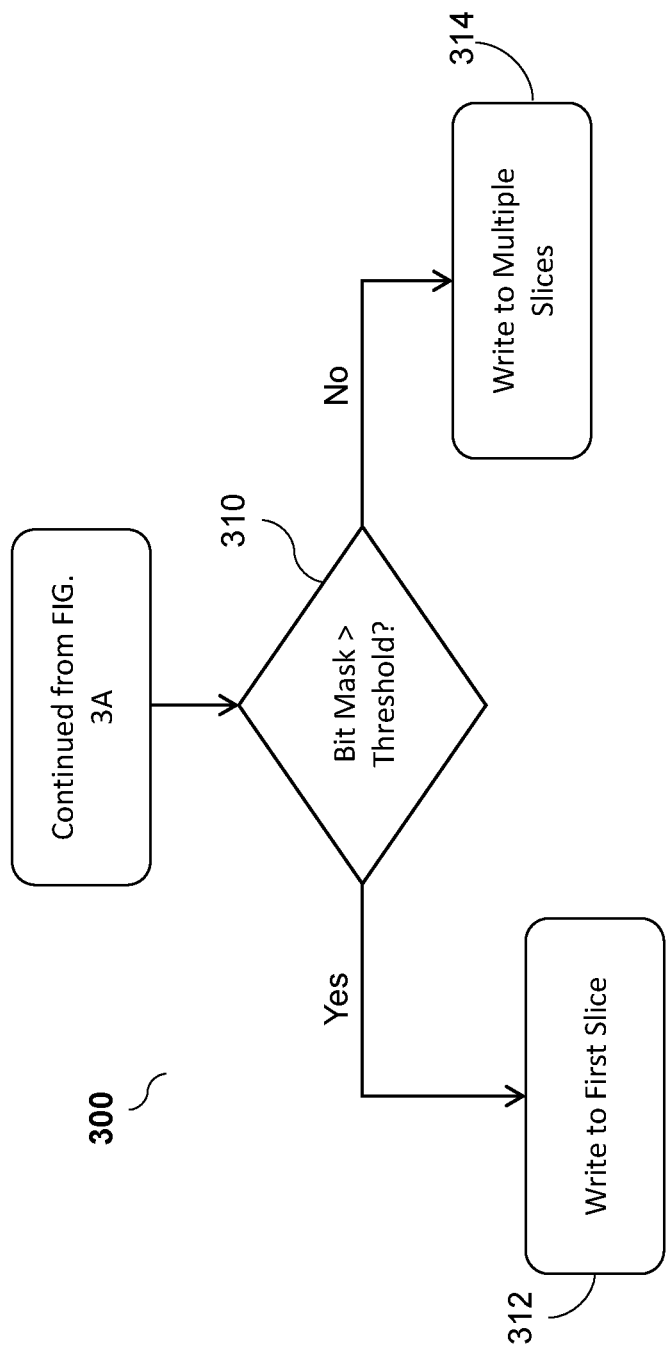

Now referring to FIGS. 3A-3B, a method 300 for reading and writing sparse data for neural network accelerators is provided. In brief overview, the method 300 can include establishing a plurality of slices (302), accessing a mask (304), determining whether read or write operation (306), modifying a data word (308), comparing byte values to thresholds (310), writing to a first slice (312), writing to a second slice or multiple slices (314), determine byte values (316), reading byte portions (318), modifying a packed representation (320), and providing the data word (322). One or more of these operations may be performed by at least one processor and/or circuitry.

At operation 302, and in some embodiments, a plurality of slices 204 can be established. In some embodiments, a circuitry 202 or processor can establish a plurality of slices 204 for a memory 210 having an access size 212 of a data word 220. The memory 210 can be portioned or partitioned to include two or more slices 204. For example, a first slice 204a can be established and a second slice 204b can be established. In some embodiments, a bit mask slice 204c can be established. The bit mask slice 204c can be a separate portion or segment of the memory 210 as compared to the first slice 204a and the second slice 204b. In some embodiments, the bit mask slice 204c can be part of or included with the first slice 204a or the second slice 204b. The number of slices 204 of the memory can vary. In some embodiments, the memory 210 can include three slices 204. In some embodiments, the memory 210 can include more than three slices 204.

In some embodiments, a first slice 204 of the plurality of slices 204 can be configured to store or provide a first side 206, first portion or first segment of the data word 220 in memory 210. The first side 206 can have a size less than that of the data word 220. For example, the first side 206 can have a size that is less than a total size or length in bits of the data word 220. The first side 206 can correspond to one or more bytes 222 of the data word 220. In an embodiments, the first side 206 can include less bytes 222 of the data word 220 than a total number of bytes 222 forming the data word 220.

In some embodiments, the slices 204 can be established each having the same size 208 or capacity. In some embodiments, one or more slices 204 can be established having a different size 208 or capacity as compared to one or more other slices 240. For example, the first slice 204a and the second slice 204b can be formed having a first size 208, and the bit mask slice 204c can be formed having a second size 208 that is different from the first size 208. The first slice 204a can be formed having a first size, the second slice 204b can be formed having a second size 208 that is different from the first size 208, and the bit mask slice 204c can be formed having a third size 208 that is different from the first size 208 and the second size 208.

In some embodiments, the size 208 of the slices 204 can be determined based in part on an energy consumption value or a power usage of the circuitry 202. For example, the size 208 of one or more slices 204 can be determined based in part on a size 208 that provides the lowest energy per access value (e.g., picojoules/byte (pJ/byte)) or a corresponding/ expected reduction in power usage of the circuitry 202 in writing one or more data words 220 and/or reading one or more data words 220 using the one or more slices 204. The energy per access value can correspond to an energy value in joules per byte (e.g., pJ/byte) to read or write data words 220 to a slice 204 of memory 210. The energy per access value can be used to determine or indicate a reduction in power usage of the circuitry 202 to read or write data words 220 to a slice 204 of memory 210.

The circuitry 202 can determine the size 208 of the slices 204, or their range or sizes 208, that provides the lowest energy per access value for the memory 210 based in part on a number of data words 220, an access size 212 or capacity of the memory 210 and/or a size of each data word 220. In some embodiments, the circuitry 202 can select the size 208 of the slices 204, or corresponding range or sizes 208, that provides the lowest energy per access value for the memory 210 and establish the slices 204 having the respective size 208. In some embodiments, the circuitry 202 can select the size 208 of the slices 204, or their range or sizes 208, based on a target or predetermined reduction in power usage value, and establish the slices 204 having the respective size 208 that provides the target or predetermined reduction in power usage value.

The bit mask slice 204c can be established having a different size 208 from other slices 204 of the memory 210. For example, the bit mask slice 204c can be established having a different size 208 from a first slice 204a and a second slice 204b of the memory 210. The size 208 or number of bits 232 of the bit mask slice 204c can be selected based at least in part on a number of bytes 222 of a data word 220. In some embodiments, the size 208 or number of bits 232 of the bit mask slice 204c can be equal to the number of bytes 222 of a data word 220. In one embodiment having a 64-bit data word 220, the size 208 of the bit mask slice 204c can be 8-bits. A bit mask 230 can be stored or maintained in the bit mask slice 204c. The bit mask 230 can include a number of bits 232 equal to or corresponding to the size of the bit mask slice 204c. Each value of each bit 232 of the bit mask 230 can correspond to or represent at least one byte value 222 of a data word 220. For example, a first position or first value of a first bit 232 of the bit mask 230 can correspond to or represent a first byte 222 of the data word 220. In some embodiments, a value (e.g., 1, 0) of each bit 232 of the bit mask 230 can indicate or represent a value (e.g., non-zero byte, zero byte) of the corresponding byte 222 of the data word. For example, a non-zero value (e.g., 1) for a bit 232 of the bit mask 230 can indicate or represent a non-zero byte value for the corresponding byte 222 of the data word and a zero value (e.g., 0) for a bit 232 of the bit mask 230 can indicate or represent a zero byte value for the corresponding byte 222 of the data word. The bit mask 230 can identify the position of non-zero byte values on a one-byte basis or a two-byte basis. For example, in some embodiments, each of the bits 232 of the bit mask 230 can represent a single byte 222 of the data word 220. In some embodiments, each of the bits 232 of the bit mask 230 can represent two bytes 222 of the data word 220.

Referring now to operation 304, and in some embodiments, a mask 230 can be accessed. In some embodiments, the circuitry 202 can access a mask 230 (e.g., bit mask) identifying byte positions 222 or byte portions 222 within the data word 220 having non-zero values. The circuitry 202 can access the bit mask 230 having a plurality of bits 232. Each of the bits 232 in the bit mask 230 can correspond to or represent at least one byte position 222 of the data word 220. For example, a first bit 232 of the bit mask 230 can represent a first byte position 222 or first byte 222 of the data word 220, a second bit 232 of the bit mask 230 can represent a second byte position 222 or second byte 222 of the data word 220, and an Nth bit 232 of the bit mask 230 can represent an Nth byte position 222 or Nth byte 222 of the data word 220. In some embodiments, each of the bits 232 in the bit mask 230 can have a zero value (e.g., 0) or a non-zero value (e.g., 1) representing or indicating a value of a byte 222 at the corresponding byte position of the data word 220.

For example, a value of the first bit 232 of the bit mask 230 can indicate a value of a byte 222 at the first byte position 222 of the data word 220, a value of the second bit 232 of the bit mask 230 can indicate a value of a byte at the second byte position 222 of the data word 220, and value of the Nth bit 232 of the bit mask 230 can indicate a value of a byte 222 at the Nth byte position 222 of the data word 220. The circuitry 202 can access the bit mask 230 and determine the byte positions 222 of the data word 220 having non-zero values based on a value of the corresponding bits 232 of the bit mask 230. The circuitry 202 can access the bit mask 230 and determine the byte positions 222 of the data word 220 having zero values based on a value of the corresponding bits 232 of the bit mask 230.

Referring now to operation 306, and in some embodiments, a determination can be made on whether an instruction or request is for a write operation or a read operation. The circuitry 202 can determine whether the instruction or request is for a write operation or a read operation. For a write operation, the method 300 can proceed to operation 308. For a read operation, the method 300 can proceed to operation 318.

Referring now to operation 308, and in some embodiments, the data word 220 can be modified. In some embodiments, the circuitry 202 can modify the data word 220 to have non-zero byte values stored starting at an end of the first side 206, and any zero byte values stored in a remainder of the data word 220. The circuitry 202 can modify the data word 220 such that the byte portions 222 having non-zero byte values are moved or re-positioned to byte locations at a first end of the first side 206 and byte portions 222 having zero byte values are moved or re-positioned after the last byte portion 222 having a non-zero byte value. For example, the circuitry can move or re-position the byte portions 222 having zero byte values from their original position (e.g., position or order as received) within the data word 220 to positions after the last byte portion 222 having a non-zero byte value such that the byte portions 222 having non-zero byte values are positioned before the byte portions 222 having zero byte values.

In some embodiments, the circuitry 202 can execute a packing algorithm to pack or modify the data word 220. For example, the packing algorithm can include a fan-in/out rate. The fan-in/out rate can correspond to or be equal to a number of connections to a memory location within memory 210 or at least one slice 204 of memory 210. The circuitry 202 can execute the packing algorithm to map or pack byte portions 222 of the data word 220 to one or more memory locations within a slice 204 of memory 210. In some embodiments, the packing algorithm can have a routing complexity of $N*(N-1)/2=\frac{1}{2} N^2-N/2$. In some embodiments, the first byte portion 222 may not use N to 1 mapping. For example, when the first N/2 byte values are zero, the circuitry can copy or map the remaining portions to a first end of a first side of the slice 204. In some embodiments, the packing algorithm can have a routing complexity of $N/2*N/2+N/2*(N/2-1)/2=\frac{3}{8} N^2-N/4$. The fan-in/out rate can be equal to N/2. In some embodiments, the circuitry 202 can pack N/2 byte portions 222 independently and concatenate the respective byte portions 222 together. For example, in such an embodiment, the packing algorithm can have a routing complexity of $N/2*N/2+N/2*(N/2-1)/2=\frac{3}{8} N^2-N/4$. The fan-in/out rate can be equal to N/2.

In some embodiments, the circuitry 202 can maintain an order of the byte portions 222 having non-zero byte values with respect to each other. For example, the circuitry 202 can move or re-position the byte portions 222 having zero values and move up the byte portions 222 having non-zero values to the positions previously occupied by one or more byte portions 222 having zero values such that the byte portions 222 having non-zero byte values are in the same order with respect to the other byte portions 222 having non-zero byte values as originally received.

In some embodiments, the circuitry 202 can maintain or change an order of the byte portions 222 having zero byte values with respect to each other. For example, the circuitry 202 can move or re-position the byte portions 222 having zero values such that the byte portions 222 having zero byte values are in the same order with respect to the other byte portions 222 having zero byte values as originally received. For example, in one embodiment, a data word 220 can include a first byte portion 222 having a non-zero byte value, a second byte portion 222 having a zero byte value, a third byte portion 222 having a zero byte value, and a fourth byte portion 222 having a non-zero byte value. The circuitry 202 can modify the data word 220 to move the second byte portion 222 having the zero byte value after the fourth byte portion 222 having the non-zero byte value. The circuitry 202 can modify the data word 220 to move the third byte portion 222 having the zero byte value after the second byte portion 222 that is positioned after the fourth byte portion 222 having the non-zero byte value in the modified data word 220. Thus, the first and fourth byte portions 222 maintain the order with respect to each other in the modified data word 220 as they were positioned in the original data word 220 (e.g., the first byte portion is before the fourth byte portion). The second and third byte portions 222 can maintain an order with respect to each other in the modified data word 220 as they were positioned in the original data word 220 (e.g., the second byte portion is before the third byte portion). In some embodiments, the order of the byte portions 222 having zero byte values does not matter, as these byte portions 222 are all of the same content and value. Hence, the circuitry 22 can move or change the order during packing (e.g., to minimize the overall amount of byte shifting).

Referring now to operation 310, a comparison of the non-byte values to a threshold can be performed. In some embodiments, the circuitry 202 can determine whether a number of non-zero byte values starting at the end of the first side 206 is less than or equal to a first access size 208 of the first slice 204. The circuitry 202 can determine a population count 234 for the bit mask 230. The population count 234 can include a value that represents or corresponds to the number of non-zero byte values of the data word 220. For example, for a data word 220 having three byte portions 222 with non-zero byte values, the population count 234 for the data word 220 can be three. For a data word 220 having five byte portions 222 with non-zero byte values, the population count 234 for the data word 220 can be five.

The circuitry 202 can compare the population count 234 to one or more thresholds to determine whether to write the data word 220 and which slice 204 or slices 204 to write the data word 220 to. In some embodiments, the circuitry 202 can compare the population count 234 to a write threshold. In some embodiments, the write threshold can indicate whether to write a data word 220 or to skip, ignore or otherwise not write a data word 220. For example, if the data word 220 has a population count 234 of zero (which fails to exceed the write threshold) or does not include any non-zero byte values, the circuitry 202 can skip, ignore or otherwise not write the data word 220. In one embodiments, the write threshold can be zero.

If the population count 234 for the data word 220 is greater than the write threshold, the circuitry can compare the population count 234 to an access size threshold of at least one slice 204 to determine which slice 204 or slices 204 to write the data word 220 to. The access size threshold can be or include an access size 208 of one or more slices 204. In some embodiments, the access size threshold can be or include an access size 208 of a first slice 204. In some embodiments, the access size threshold can be or include an access size 208 of a smallest slice 204 of the plurality of slices. If the population count 234 for the data word 220 is less than or equal to the first access size threshold of the first slice 204, the method 300 can proceed to operation 312. If the population count 234 for the data word 220 is less than or equal to the first access size threshold of the first slice 204, the method 300 can proceed to operation 314.

Referring now to operation 312, and in one or more embodiments, the modified data word 220 can be written to the first slice 204. In some embodiments, the circuitry 202 can write, responsive to the determination or comparison, the modified data word 220 to the memory 210 via at least the first slice 204. The circuitry can determine that the population count 234 of the modified data word 220 is less than or equal to the access size 208 of the first slice 204. The circuitry can determine that the number of non-zero byte values of the modified data word 220 is less than or equal to the access size 208 of the first slice 204. The circuitry 202 can write the byte portions 222 of the modified data word 220 having non-zero byte values to the first slice 204 and skip, ignore or not write the byte portions 222 of the modified data word 220 having zero byte values to memory 210. The circuitry 202 can write the first side of the modified data word 220 only via the first slice 204. For example, if the number of non-zero byte values of the modified data word 220 is less than or equal to the access size 208 of the first slice 204, the circuitry can write all of the byte portions 222 having non-zero byte values to the first slice 204 and not access or write to any other slices 204 of the plurality of slices 204.

In some embodiments, the circuitry 202 can maintain an order of the byte portions 222 having non-zero byte values with respect to each other when writing the modified data word 220 to the first slice 204. For example, the circuitry 202 can write the modified data word 220 to the first slice such that the byte portions 222 having non-zero values are in the same order with respect to the other byte portions 222 having non-zero byte values as originally received. For example, in one embodiment, the circuitry 202 can write a first byte portion 222 having a non-zero byte value to a first end or first position of the first side 206 of the first slice 204 and write a second byte portion 222 having a non-zero byte value to a second position of the first side 206 of the first slice 204 after the first byte portion 222 of the modified data word 220.

Referring now to operation 314, and in some embodiments, the modified data word 220 can be written to the first slice 204 and the second slice 204. In some embodiments, the circuitry 202 can write, responsive to the determination or comparison, the modified data word 220 to the memory 210 via multiple slices 204 of the memory 210. The circuitry can determine that the population count 234 of the modified data word 220 is greater than the access size 208 of the first slice 204. The circuitry can determine that the number of non-zero byte values of the modified data word 220 is greater than the access size 208 of the first slice 204. The circuitry write 202 can write the byte portions 222 of the modified data word 220 having non-zero byte values to the first slice 204 and the second slice 204 or write the byte portions 222 of the modified data word 220 having non-zero byte values to the more than two slices 204 based in part on the number of byte portions 222 of the modified data word 220 having non-zero byte values as compared to the access size 2308 of each of the respective slices 204. The circuitry 202 can write the bytes 222 or byte portions 222 of the first side of the modified data word 220 via the first slice 204 and remainder non-zero bytes 222 or byte portions 222 having non-zero byte values via a second slice 204.

The circuitry 202 can write the byte portions 222 having non-zero byte values to the slices 204 in an order in which the respective byte portions 222 having non-zero byte values were arranged in the original data word 220 with respect to each other. For example, the circuitry 202 can maintain an order of the byte portions 222 having non-zero byte values with respect to each other when writing the modified data word 220 to the first slice 204 and the second slice 204 or a plurality of slices 204. The circuitry 202 can write the modified data word 220 to the first slice such that the byte portions 222 having non-zero values are in the same order with respect to the other byte portions 222 having non-zero byte values as originally received, and can write the remaining byte portions 222 having non-zero values to the second slice 204 and/or additional slice(s) 204 once the first slice 204 is full or reached a capacity.

For example, in one embodiment, the first slice 204 can have an access size 208 of ten and the modified data word 220 can include fifteen byte portions 222 having non-zero data values. The circuitry 202 can write the first ten byte portions 222 having a non-zero byte value to the first slice 204 with the first byte portion 222 having a non-zero byte value written to a first end or first position of the first side 206 of the first slice 204. The circuitry 202 can write the remaining five byte portions 222 having a non-zero byte value to the second slice 204 with the eleventh byte portion 222 having a non-zero byte value written to a first end or first position of the first side 206 of the second slice 204. Thus, the fifteen byte portions 222 having non-zero byte values of the modified data word 220 can be maintained in the same order and written across multiple slices 204 of the memory 210.

Referring now to operation 316, and in one or more embodiments, the number of non-zero byte values can be determined. In some embodiments, the circuitry can determine, from the mask 230, that a number of non-zero byte values of the data word 220 is less than or equal to a first access size 208 of the first slice 204. The circuitry 202 can determine that a read request or read instruction has been received for at least one data word 220. The circuitry 202 can use the bit mask 230 for the respective data word 220 to determine the number of non-zero byte values. The circuitry 202 can determine that the population count 234 of the data word 220 or the number of non-zero byte values of the data word 220 is less than or equal to the access size 208 of the first slice 204. The number of non-zero byte values of the data word 220 can indicate what slice or slices 204 the data word 220 is stored in and how many slices 204 the different byte portions 222 of the data word 220 are stored across. For example, if the number of non-zero byte values of the data word 220 is less than or equal to the access size 208 of the first slice 204, the circuitry can determine that each of or all of the byte positions 222 of the data word 220 having non-zero byte values are stored in the first slice 204. If the number of non-zero byte values of the data word 220 is greater than the access size 208 of the first slice 204, the circuitry can determine that each of or all of the byte positions 222 of the data word 220 having non-zero byte values are stored in multiple slices 204 (e.g., the first slice 204 and the second slice 204).

Referring now to operation 318, and in some embodiments, the data word 220 can be read. In some embodiments, the circuitry 202 can read, responsive to the determination, a packed representation 224 of the data word 220 stored in memory 210 via the first slice 204. The packed representation 224 can include the non-zero byte values stored starting at an end of the first side 206 of the data word 220 and any zero byte values stored in a remainder of the data word 220. In some embodiments, the packed representation 224 can correspond to the modified data word 220.

The circuitry 202 can begin the read operation at the first end or first position of the first side 206 of the first slice 204. The circuitry 202 can read the byte portions 222 of the data word 220 in the order the byte portions 222 were stored in the first slice 204 or in multiple slices 204 of the memory 210. For example, the circuitry 202 can read a first byte portion 222 of the data word 220 written to the first position of the first side 206 of the first slice 204 first and read a second byte portion 222 of the data word 220 written to a second position of the first side 206 of the first slice 204 next. In some embodiments, the circuitry 202 can read the byte portions 222 having non-zero byte values before reading the byte portions 222 having zero byte values based on the order the byte portions 222 of the data word 220 were written to the one or more slices 204. In some embodiments, the circuitry 202 does not have to store, read or access any byte portions 222 having zero byte values, and instead inserts byte portions 222 having zero byte values at locations indicated by the bit mask in the unpacking process.

In some embodiments, with the number of non-zero byte values of the data word 220 being less than or equal to the access size 208 of the first slice 204, the circuitry 202 can read the packed representation 224 of the data word 220 from only the first slice 204. For example, as the number of non-zero byte values of the data word 220 is less than or equal to the access size 208 of the first slice 204, all of the byte portions 222 having non-zero byte values can be written to the first slice 204. The circuitry 202 can access the first slice 204 to read the packed representation 224 of the data word 220. In some embodiments, with the number of non-zero byte values of the data word 220 being greater than the access size 208 of the first slice 204, the circuitry 202 can read the byte portions 222 of the packed representation 224 of the data word 220 in an order of how the byte portions 222 were written to the multiple slices 204. For example, the circuitry 202 can read a first side or first byte portion 222 of the data word 220 via the first slice 204 and any remainder non-zero bytes or remaining byte portions 222 having non-zero byte values via the remaining portions or sides of the first slice 204 and via a second slice 204 of the plurality of slices 204. In some embodiments, the circuitry 202 can read the byte portions 222 written to the first slice 204 first or before reading the byte portions 222 written to a second slice 204.

Referring now to operation 320, the packed representation 224 of the data word 220 can be modified. In some embodiments, the circuitry 202 can modify the packed representation 224 of the data word 220 to restore an original order of the byte portions 222 corresponding to an order of the byte portions 222 of the data word when the data word 220 was received or prior to being written to the memory 210. The circuitry 202 can modify the packed representation 224 of the data word 220 to restore data word 220 to an original format or format corresponding to when the data word 220 was received or prior to being written to the memory 210. For example, the circuitry 202 can use the bit mask 230 to determine the number of non-zero byte values of the data word 220 and the number of zero byte values of the data word 220. The circuitry 202 can use the individual bits 232 of the bit mask 230 to determine the arrangement or order of the byte portions 222 of the data word 220. Each bit 232 of the bit mask 230 can represent at least one byte portion 222 of the data word 220. The circuitry 202, using the bit mask 230, can determine the original positioning of the byte portions 222 having non-zero byte values in the original format of the data word 220. The circuitry 202, using the bit mask 230, can determine the original positioning of the byte portions 222 having zero byte values in the original format of the data word 220. The circuitry 202, using the bit mask 230, can determine whether one or more byte portions 222 having non-zero byte values in the original format of the data word 220 included one or more byte portions 222 having a zero byte value between them.

The circuitry 202 can modify the packed representation 224 of the data word 220 such that the byte portions 222 having non-zero byte values are moved or re-positioned to an original position in an original format of the data word 220. The circuitry 202, using the bit mask 230, can determine whether one or more byte portions 222 having non-zero byte values in the original format of the data word 220 included one or more byte portions 222 having a zero byte value between them. The circuitry 202 can insert, move or re-position bye portions 222 having a zero byte value into positions of the original data word 220 that included one or more byte portions 222 having a zero byte value. The packed representation 224 of the data word 220 can be modified to rebuild or regenerate the original data word 220.

Referring now to operation 322, and in some embodiments, the packed representation 224 of the data word 220 can be provided. In some embodiments, the circuitry 202 can provide, from the packed representation 224, the data word 220 having the non-zero byte values and the zero byte values at the positions indicated by the mask 230. The circuitry 202 can provide the data word 220 in the original format as when the respective data word 220 was received or in a format corresponding to the format of the data word 220 prior to the data word 220 being packed and/or written to the data memory 210. In some embodiments, the circuitry 202 can provide the data word 220 as output data such as, but not limited to, output 112 of FIG. 1A.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   accessing, by circuitry, a mask identifying byte positions within a data word having non-zero values in memory, wherein each bit of the mask has a first value or a second value, the first value indicating that a byte of the data word corresponds to a non-zero byte value, the second value indicating that the byte of the data word corresponds to a zero byte value;
   modifying, by the circuitry, the data word to have non-zero byte values stored at an end of a first side of the data word in the memory, and any zero byte values stored in a remainder of the data word; and
   writing, by the circuitry, the modified data word to the memory via at least a first slice of a plurality of slices that is configured to access the first side of the data word in the memory.

2. The method of claim 1, further comprising generating the mask as one of a one-byte mask or a two-byte mask.

3. The method of claim 1, further comprising determining, by the circuitry, a number of non-zero byte values of the first side is less than or equal to a first access size of the first slice.

4. The method of claim 3, further comprising writing, by the circuitry, the first side of the modified data word only via the first slice.

5. The method of claim 1, further comprising determining, by the circuitry, a number of non-zero byte values starting at the end of the first side is greater than a first access size of the first slice.

6. The method of claim 5, further comprising writing, by the circuitry, bytes of the first side of the modified data word via the first slice and remainder non-zero bytes via a second slice.

7. The method of claim 1, wherein one of a first access size of the first slice or a second access size of a second slice of the plurality of slices is selected to provide a predetermined reduction in power usage of the circuitry in accessing the memory.

8. The method of claim 1, further comprising determining, by the circuitry, a number of non-zero byte values of the modified data word based on the mask.

9. A method comprising:
    accessing, by circuitry, a mask identifying byte positions within a data word having non-zero values in memory, wherein each bit of the mask has a first value or a second value, the first value indicating that a byte of the data word corresponds to a non-zero byte value, the second value indicating that the byte of the data word corresponds to a zero byte value;
    reading, by the circuitry, a packed representation of the data word stored in memory via at least a first slice of a plurality of slices that is configured to access a first side of the data word in the memory, the packed representation comprising non-zero byte values stored starting at an end of the first side of the data word in the memory, and any zero byte values stored in a remainder of the data word; and
    providing, by the circuitry from the packed representation, the data word having the non-zero byte values and the zero byte values at the byte positions identified by the mask.

10. The method of claim 9, wherein the mask identifies the byte position of non-zero byte values on a one-byte basis or a two-byte basis.

11. The method of claim 9, further comprising determining, by the circuitry, a number of the non-zero byte values of the data word is less than or equal to a first access size of the first slice.

12. The method of claim 11, further comprising reading, by the circuitry, the packed representation of the data word via only the first slice.

13. The method of claim 9, further comprising determining, by the circuitry, a number of the non-zero byte values of the data word is greater than a first access size of the first slice.

14. The method of claim 13, further comprising reading, by the circuitry, the first side of the data word via the first slice and any remainder non-zero bytes via a second slice of the plurality of slices.

15. The method of claim 1, wherein one of a first access size of the first slice or a second access size of a second slice of the plurality of slices is selected to provide a predetermined reduction in power usage of the circuitry in reading from the memory.

16. A device comprising:
    memory having an access size of a data word; and
    circuitry configured to:
        access a mask identifying byte positions within the data word having non-zero values in the memory, wherein each bit of the mask has a first value or a second value, the first value indicating that a byte of the data word corresponds to a non-zero byte value, the second value indicating that the byte of the data word corresponds to a zero byte value;
        modify the data word to have non-zero byte values stored at an end of a first side of the data word in the memory, and any zero byte values stored in a remainder of the data word; and
        write the modified data word to the memory via at least a first slice of a plurality of slices that is configured to access the first side of the data word in the memory.

17. The device of claim 16, wherein the circuitry is configured to read, a packed representation of the data word stored in the memory via at least the first slice, wherein the packed representation comprises the non-zero byte values stored in the first side of the data word and any zero byte values stored in remaining bytes of the data word.

18. The device of claim 17, wherein the circuitry is configured to create the data word to have the non-zero byte values and the zero byte values stored in the byte positions identified by the mask.

19. The device of claim 16, wherein the circuitry is further configured to read the first side of the data word via the first slice and any remaining non-zero bytes via a second slice of the plurality of slices.

20. The device of claim 16, wherein one of a first access size of the first slice or a second access size of a second slice of the plurality of slices is selected to provide a predetermined reduction in power usage of the circuitry in reading from the memory.

* * * * *